(12) United States Patent
Kim

(10) Patent No.: US 9,033,319 B2
(45) Date of Patent: May 19, 2015

(54) ELECTRONIC ACTIVE MOUNT CAPABLE OF BIDIRECTIONAL CONTROL

(71) Applicant: Hyundai Motor Company, Seoul (KR)

(72) Inventor: Seung-Won Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 12 days.

(21) Appl. No.: 13/949,925

(22) Filed: Jul. 24, 2013

(65) Prior Publication Data

US 2014/0284857 A1    Sep. 25, 2014

(30) Foreign Application Priority Data

Mar. 19, 2013 (KR) .................. 10-2013-0029048

(51) Int. Cl.
*F16F 13/08* (2006.01)
*F16F 13/26* (2006.01)

(52) U.S. Cl.
CPC ................. *F16F 13/08* (2013.01); *F16F 13/26* (2013.01); *F16F 13/264* (2013.01)

(58) Field of Classification Search
CPC ................................ F16F 13/08; F16F 13/264
USPC ........................ 267/140.14–140.15
See application file for complete search history.

(56) References Cited

U.S. PATENT DOCUMENTS

| | | | | |
|---|---|---|---|---|
| 4,693,455 A | * | 9/1987 | Andra ...................... | 267/140.14 |
| 4,872,652 A | * | 10/1989 | Rohner et al. .......... | 267/140.14 |
| 6,062,550 A | * | 5/2000 | Aoki ........................ | 267/140.13 |
| 6,145,802 A | * | 11/2000 | Nakagaki et al. ....... | 267/140.14 |
| 6,523,816 B1 | * | 2/2003 | Gastineau et al. ....... | 267/140.14 |
| 6,527,260 B2 | * | 3/2003 | Takeo et al. ............. | 267/140.11 |

FOREIGN PATENT DOCUMENTS

| | | | |
|---|---|---|---|
| DE | 102007014710 B4 | * | 2/2009 |
| GB | 2359607 A | * | 8/2001 |
| JP | 08-014319 | | 1/1996 |
| KR | 10-2003-0034913 A | | 5/2003 |
| KR | 10-2010-0011765 A | | 2/2010 |
| KR | 10-2013-0003749 A | | 1/2013 |

* cited by examiner

*Primary Examiner* — Anna Momper
(74) *Attorney, Agent, or Firm* — McDermott Will & Emery LLP

(57) ABSTRACT

An electronic active mount capable of a bidirectional control includes a core positioned inside a housing and connected to an engine. A main rubber is configured to connect the core and the housing. An upper orifice is coupled to an end of the main rubber to form an upper fluid chamber. A membrane is coupled to be moved up and down is connected to a lower orifice. A lower housing is formed at a central portion of the lower orifice, and a diaphragm is spaced apart from the lower orifice at a predetermined distance, which may attenuate vibration by using two electromagnets provided in an electronic mount.

4 Claims, 5 Drawing Sheets

US 9,033,319 B2

ELECTRONIC ACTIVE MOUNT CAPABLE OF BIDIRECTIONAL CONTROL

CROSS-REFERENCE TO RELATED APPLICATIONS

This application is based on and claims the benefit of priority under 35 U.S.C. §119 to Korean Patent Application No. 10-2013-0029048, filed on Mar. 19, 2013, in the Korean Intellectual Property Office, the disclosure of which is incorporated herein by reference in its entirety.

TECHNICAL FIELD

The present disclosure relates to an electronic mount, and more particularly, to an electronic active mount capable of bidirectional control, which may attenuate vibration transmitted in both directions by using two electromagnets provided in the electronic mount while appropriately coping with vibration.

BACKGROUND

An engine mount is disposed between a vehicle body and an engine to support the engine and serves to reduce noise and vibrations which are transmitted from the engine into a room of a vehicle through the vehicle body. In addition, excessive vibration of the engine such that the engine shakes by resonance according to a mass of the engine and rigidity of the mount occurs due to road vibration excitation when the vehicle travels. The mount, thus needs to be designed to secure high attenuation performance at the resonance frequency in order to reduce excessive vibration.

That is, the engine of the vehicle or a power plant including the engine and a transmission is supported in the vehicle body by interposing therebetween the mount having a function of suppressing vibration and noise. For this function of preventing vibration and noise, recently, a liquid sealed mount sealed with a fluid having viscosity is widely used.

The liquid sealed mount has a fluid chamber, enclosed by a main rubber plate and bellows, is separated into an upper fluid chamber and a lower fluid chamber by operating plates and a plate having an annular passage. When vibration is occurs from the engine, volume of the upper fluid chamber is varied as a main rubber (insulator) is deformed, an amount of the fluid corresponding the varied volume is moved from the upper fluid chamber to the lower fluid chamber, and at this time, the fluid flows along the annular passage or in a free gap between the operating plates.

If the amount of the fluid corresponding to the deformed volume of the main rubber is larger than the amount of fluid flowing between the free gap between the operating plates (that is, when a low frequency and large displacement vibration is transmitted from the engine), the fluid flows along the annular passage without passing through the gap between the operating plates, and at this time, the fluid in the annular passage generates resonance at a particular frequency, thereby transmitting a high attenuating force to the engine.

However, there are drawbacks such as an output is decreased and fuel efficiency deteriorates due to increase in overall weight of the vehicle because cost of the liquid sealed mount and manufacturing costs for the vehicle are excessively high, and the liquid sealed mount is heavy. Accordingly, a less expensive and lighter air damping mount has been developed recently.

However, the air damping mount is restricted for a limited degree of freedom in design because an amount in which the vibration is attenuated and a frequency at which maximum attenuation occurs are simultaneously varied in accordance with size of an air hole through which air flows.

Recently, as improvement in fuel efficiency has been emphasized as an important factor for developing vehicles, a representative engine such as a carbon dynamic airbox (CDA) engine has been introduced. The CDA engine stops a part of cylinders when the vehicle travels at a constant speed except for a case in which a large amount of torque is necessary, thus considerably improving fuel efficiency.

Nevertheless, since a high vibration occurs at the time of stopping engine with deterioration of noise, vibration, and harshness (NVH) of the vehicle, commercializing the CDA engine is difficult. To solve this problem, a technology of active engine mounting has been developed.

The engine mount serves to autonomously produce force and offset the vibration in a case in which a large vibration occurs in a CDA operation section. There are various active mounting structures, but an electronic or electric active mounting to be applied to the CDA is generally used which may produce vibration exciting force with a phase difference.

Electronic active mounting is used to perform control using one electromagnet, and may attenuate vibration at a particular frequency only. The electric active mounting is capable of attenuating vibration at all the frequencies having one electromagnet, and one permanent magnet thereby has better performance than the electronic active mounting.

The electronic active mount attenuates only a particular frequency by performing unidirectional control, but the electric active mount is capable of performing bidirectional control by using an additional permanent magnet and has characteristics of attenuating multiple frequencies.

However, because the additional permanent magnet is made of a rare earth material, supply and demand thereof are unstable, cost thereof is high, and weight thereof is large. As a result, utilizing a permanent magnet can be problematic.

SUMMARY

The present disclosure has been made in an effort to provide an electronic active mounting capable of performing a bidirectional control using two inexpensive coil electromagnets.

An electronic active mount capable of bidirectional control includes: a core positioned inside a housing having a cylindrical shape and connected to an engine; a main rubber configured to connect an outer surface of the core and an inner surface of the housing; an upper orifice coupled to an end of the main rubber so as to form an upper fluid chamber capable of accommodating a fluid, and having a central portion to which a membrane is coupled to be moved in an up and down direction; a lower orifice connected to a lower end of the upper orifice; a lower housing formed at a central portion of the lower orifice; and a diaphragm spaced apart from the lower orifice at a predetermined distance so as to form a lower fluid chamber capable of accommodating a fluid.

In addition, an upper bobbin and an upper electromagnet configured to enclose the upper bobbin may be included in the membrane, and a lower bobbin and a lower electromagnet configured to enclose the lower bobbin may be included in the lower housing.

In addition, the membrane and the lower housing may be spaced apart from each other at a predetermined distance to form an air chamber which is a space between a lower end surface of the membrane and an upper end surface of the lower housing so as to accommodate air. An air hole for air from the atmosphere to enter the air chamber may be formed.

Moreover, a stopper protruding in a lower direction may be formed on a lower end surface of the membrane, and height of the stopper may be the same as height of the air chamber.

According to the exemplary embodiment of the present disclosure, the electronic active mount using electromagnets with a coil structure may implement performance identical to performance of an electric active mount (a permanent magnet plus an electromagnet). Accordingly, the electronic mount may perform only unidirectional control so as to attenuate only a particular frequency component of vibration. In contrast, the bidirectional control of the present disclosure may produce all frequencies so as to attenuate all components of vibrations that are necessary for an input vibration, and maximize noise, vibration, and harshness (NVH) performance.

In addition, the existing electric mount capable of bidirectional control with a structure driven by a permanent magnet and an electromagnet is disadvantageous due to heavy weight and high cost, unstable supply and demand of materials in accordance with a situation of the place of origin, and an undeterminable price. In contrast, the present disclosure enables the bidirectional control by using an electromagnet having an inexpensive coil instead of using the expensive and heavy permanent magnet, and may maximize NVH performance and reduce production costs.

In addition, the air chamber is formed between the upper and lower electromagnets and positioned at a lower portion of the membrane being exposed to the atmosphere so as to absorb an input vibration even in a situation in which a carbon dynamic airbox (CDA) engine is turned off. There are advantages such as an increase in the NVH performance more by a general hydro mount thereof, and a possible implementation of reducing dynamic characteristics.

DETAILED DESCRIPTION OF THE EMBODIMENTS

Figure 1:
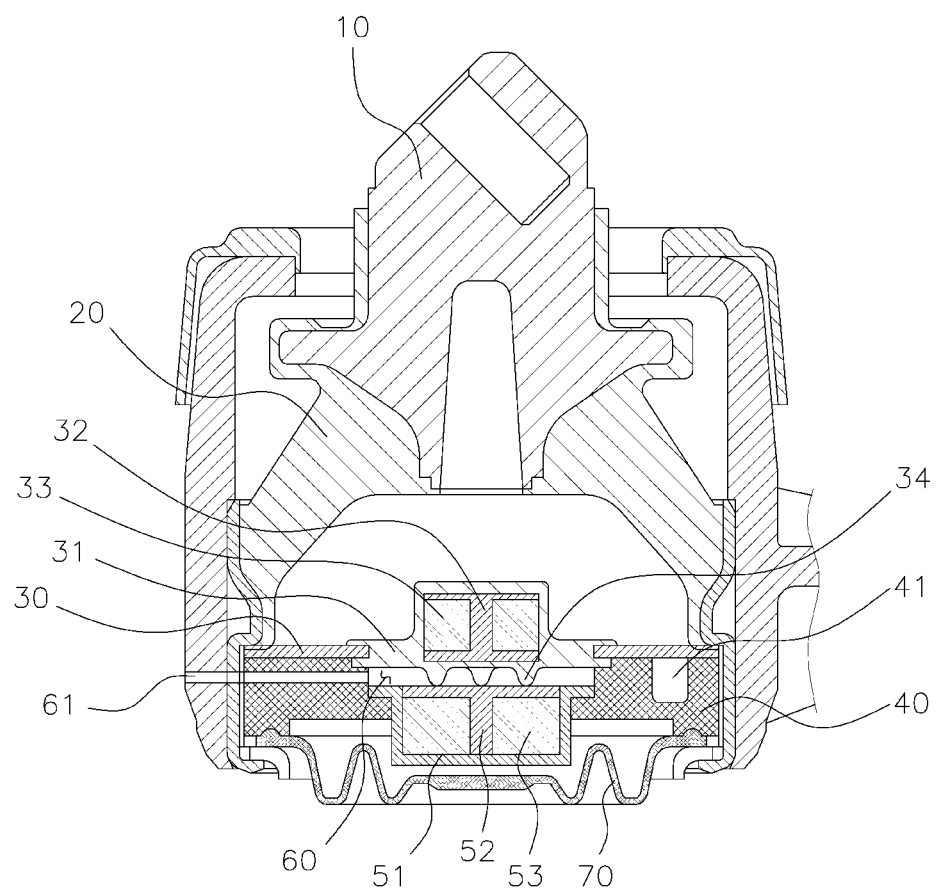
FIG. 1 is a cross-sectional view illustrating an electronic active mount capable of bidirectional control of the present disclosure.

Hereinafter, the present disclosure will be described in more detail with reference to the accompanying drawings.

An electronic active mount capable of bidirectional control of the present disclosure may include: a core 10 positioned in a housing having a cylindrical shape and connected to an engine; a main rubber 20 configured to connect an outer surface of the core 10 and an inner surface of the housing; an upper orifice 30 coupled to an end of the main rubber 20 so as to form an upper fluid chamber capable of accommodating a fluid, and having a central portion to which a membrane 31 is coupled to be moved in an up and down direction; a lower orifice 40 connected to a lower end of the upper orifice 30; an orifice nozzle 41 provided in the lower orifice 40; a lower housing 51 formed at a central portion of the lower orifice 40; and a diaphragm 70 spaced apart from the lower orifice 40 at a predetermined distance so as to form a lower fluid chamber capable of accommodating a fluid.

As illustrated in FIG. 1, the present disclosure presents a mount used to minimize vibrations, noise, and the like which are generated from the engine and transmitted to a vehicle body as well as to inside a vehicle, and an overall exterior appearance of the mount is similar to that of a hydro mount or an air damping mount, as used in the related art.

Recently, as it is necessary to improve fuel efficiency of the vehicle, a carbon dynamic airbox (CDA) engine receives attention which may considerably improve fuel efficiency by stopping a part of cylinders when the vehicle travels at a constant speed except for a case in which a large amount of torque is necessary, where an electronic or electric active mount is generally being used in order to improve an NVH of the CDA engine.

Since the electronic mount, which controls vibrations using one electromagnet, has a limitation of attenuating vibration only at a particular frequency, the electric active mount including one electromagnet and one permanent magnet is considered to be used. However, because the permanent magnet used in the electric active mount is made of a rare earth material, there are drawbacks such as high cost and heavy weight. Therefore, the electric active mount is rarely used in an actual vehicle.

Therefore, in order to solve the aforementioned problem, the present disclosure relates to an active mount capable of performing a bidirectional control by using two inexpensive coil electromagnets, which may be driven in an electric manner by using the electronic mount, and particularly, to resolve one of the major drawbacks of an active mount used in the related art such as deterioration of noise, vibration, and harshness (NVH) due to high dynamic characteristics when an active operation is turned off.

Referring to FIG. 1, the core 10, the main rubber 20, the lower orifice 40, the diaphragm 70, and the like are not greatly different from those of a mount used in the related art, and particularly, configurations and operational processes of the upper orifice 30, the membrane 31, and the lower housing 51 of the present disclosure are different from those of the electronic mount of the related art.

The upper orifice 30 has a round circular plate shape as a whole having a predetermined thickness, and particularly, has an annular shape of the circular plate in which a vacant space is formed in a central portion. Further, the membrane 31 made of a rubber material is disposed in the vacant space to be moved or flow in an up and down direction.

Particularly, an upper bobbin 32 made of steel and an upper electromagnet 33 configured to enclose the upper bobbin 32 are included inside the membrane 31, more details thereof having illustrated in FIGS. 1 and 4 to 6, and a lower bobbin 52 made of steel and a lower electromagnet 53 configured to enclose the lower bobbin 52 are included inside the lower housing 51 that faces the membrane 31.

The present disclosure enables control by disposing the upper electromagnet 33 and the lower electromagnet 53 in order to enable a bidirectional control, and reduces manufacturing costs and production costs while performing control use that of an electric active mount which performs bidirectional control by using an electromagnet and a permanent magnet in the related art.

That is, the upper electromagnet 33 is integrally installed in an internal space of the membrane 31 made of a rubber material, and the upper bobbin 32 having an 'I' shape is disposed at a center of the membrane 31 so as to enclose the electromagnet.

In addition, the lower electromagnet 53 is fixedly coupled with the lower bobbin 52 in an internal space of the lower housing 51, and the lower bobbin 52 having a 'T' shape is disposed at a central portion of the lower housing 51 so as to enclose the lower electromagnet 53.

Polarity of the lower electromagnet 53 may be freely changed to N-pole or S-pole, if necessary, and accordingly, attractive force or repulsive force is produced between the lower electromagnet 53 and the upper electromagnet 33. Further, the lower electromagnet 53 fixed to the lower housing 51 is not movable, but the upper electromagnet 33 positioned inside the membrane 31 made of a rubber material has a structure that may be vibrated upward and downward.

Particularly, an air chamber 60 having a space in which air may be accommodated is formed between a lower end surface of the membrane 31 and an upper end surface of the lower housing 51 with a predetermined distance, and an air hole 61 configured to connect one side surface of the air chamber 60 to air in the atmosphere is formed.

The air chamber 60 that provides a space in which external air flows is formed in the space between the upper electromagnet 33 and the lower electromagnet 53, thereby improves the NVH by improving the dynamic characteristics of the engine mount, and improves a major drawback of high dynamic characteristics of the active mount because the membrane 31 (vibration exciting plate) is fixed when an active operation is turned off. Further, an excellent damping performance is achieved by using the upper and lower fluid chambers, the orifice, and the air chamber 60 even when the active operation is turned off.

A general active mount has a structure in which a rod (steel bar) is connected by installing a separate driving device at a lower portion, and has a drawback in which driving performance deteriorates because of very high dynamic characteristics when the active operation is not performed (when the CDA is not operated such that a driving operation is performed with a general fluid mount type). However, the present disclosure does not connect the upper electromagnet and the lower electromagnet 53 by a rod, but the mount is operated by using a magnetic field between the electromagnets. Particularly, the air chamber 60 is installed in the space where the upper electromagnet and the lower electromagnet 53 are spaced apart from each other, and therefore dynamic characteristics are reduced even when the active operation is turned off.

Moreover, a stopper 34, which protrudes in a lower direction, may be formed at a lower end surface of the membrane 31, and height of the stopper 34 may be the same as height of the air chamber 60.

Figure 5:
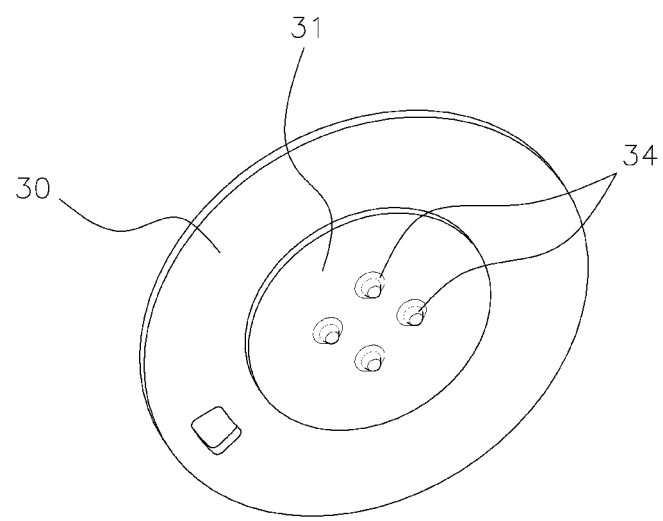
FIG. 5 is a lower perspective view illustrating the upper orifice plate and the membrane used in the present disclosure.
Figure 6:
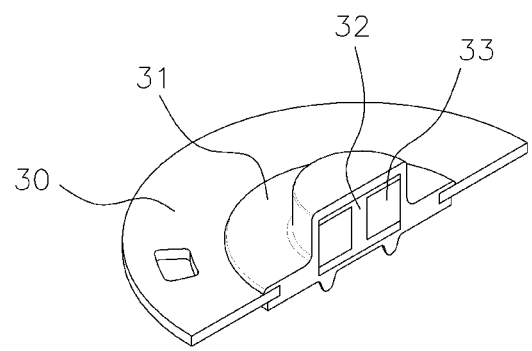
FIG. 6 is a partially cross-sectional view illustrating the upper orifice plate and the membrane used in the present disclosure.

As illustrated in FIG. 5, the stopper 34 having a predetermined height protrudes on the lower end surface of the membrane 31 connected to the central portion of the upper orifice 30, and by this stopper 34, air accommodated in the air chamber 60 absorbs shock even when the active operation is turned off, attenuates vibrations, and reduces dynamic characteristics.

The present exemplary embodiment presents as an example a configuration in which four stoppers 34 are formed, but the height and the number of stoppers 34 may be varied in accordance with vibrations which need to be attenuated. When the membrane 31 is moved toward a lower direction by attractive force between the electromagnets (force of pulling the membrane 31), the stopper 34 serves to prevent the electromagnets from being connected to each other and not being again separated from each other by being shortened.

The air hole 61 is connected to one side of the air chamber 60, and the air hole 61 is connected to the outside of the mount so as to cause the external atmosphere to flow air in and out of the air chamber 60. Further, when the electromagnets are turned off, the air chamber 60 supports the membrane 31, and the air inside the air chamber 60 flows to and from the atmosphere in accordance with an input load, thereby achieving reduction in dynamic characteristics.

Figure 2:
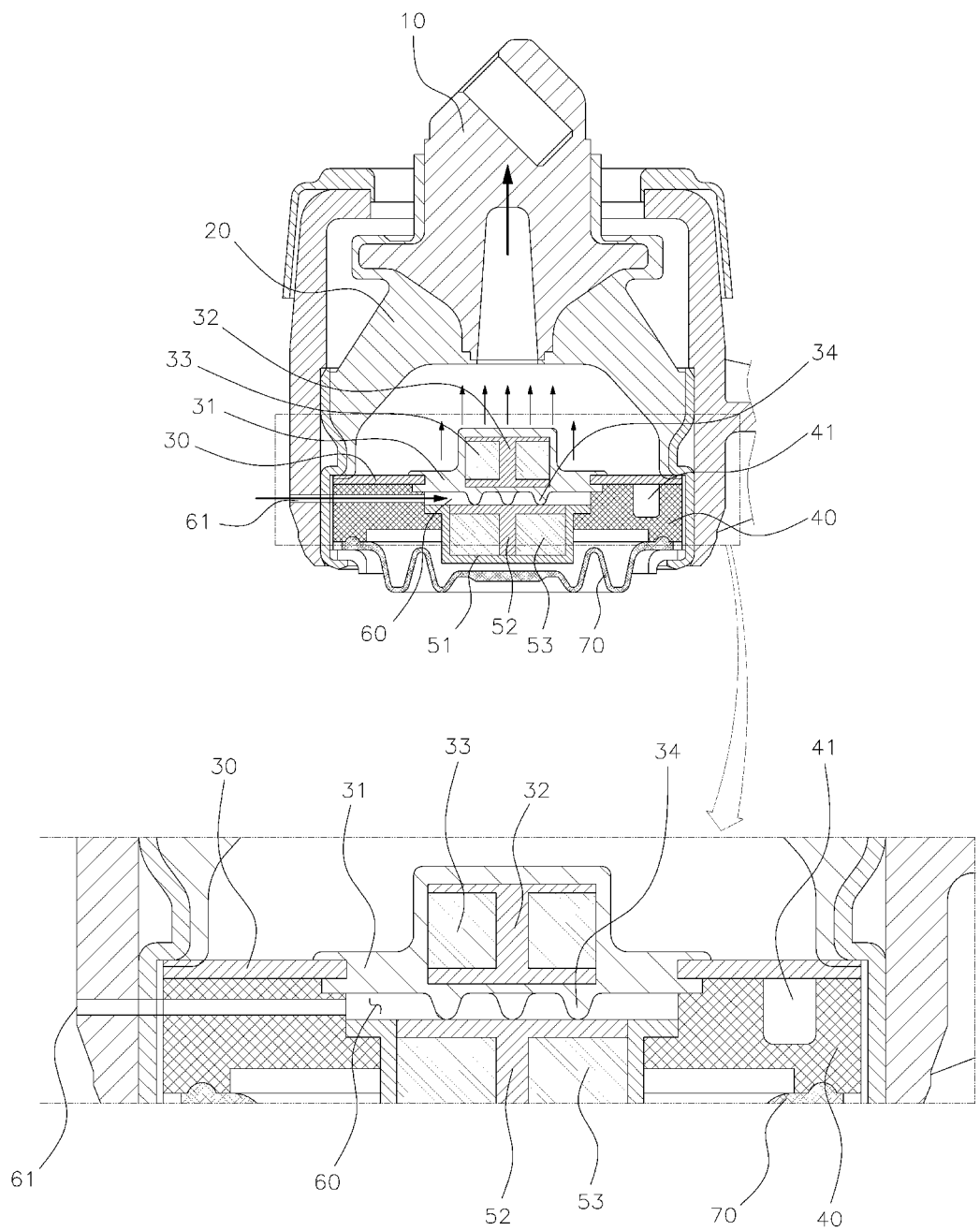
FIG. 2 is a cross-sectional view and a partially enlarged view illustrating a case in which air flows into the electronic active mount capable of bidirectional control of the present disclosure.
Figure 3:
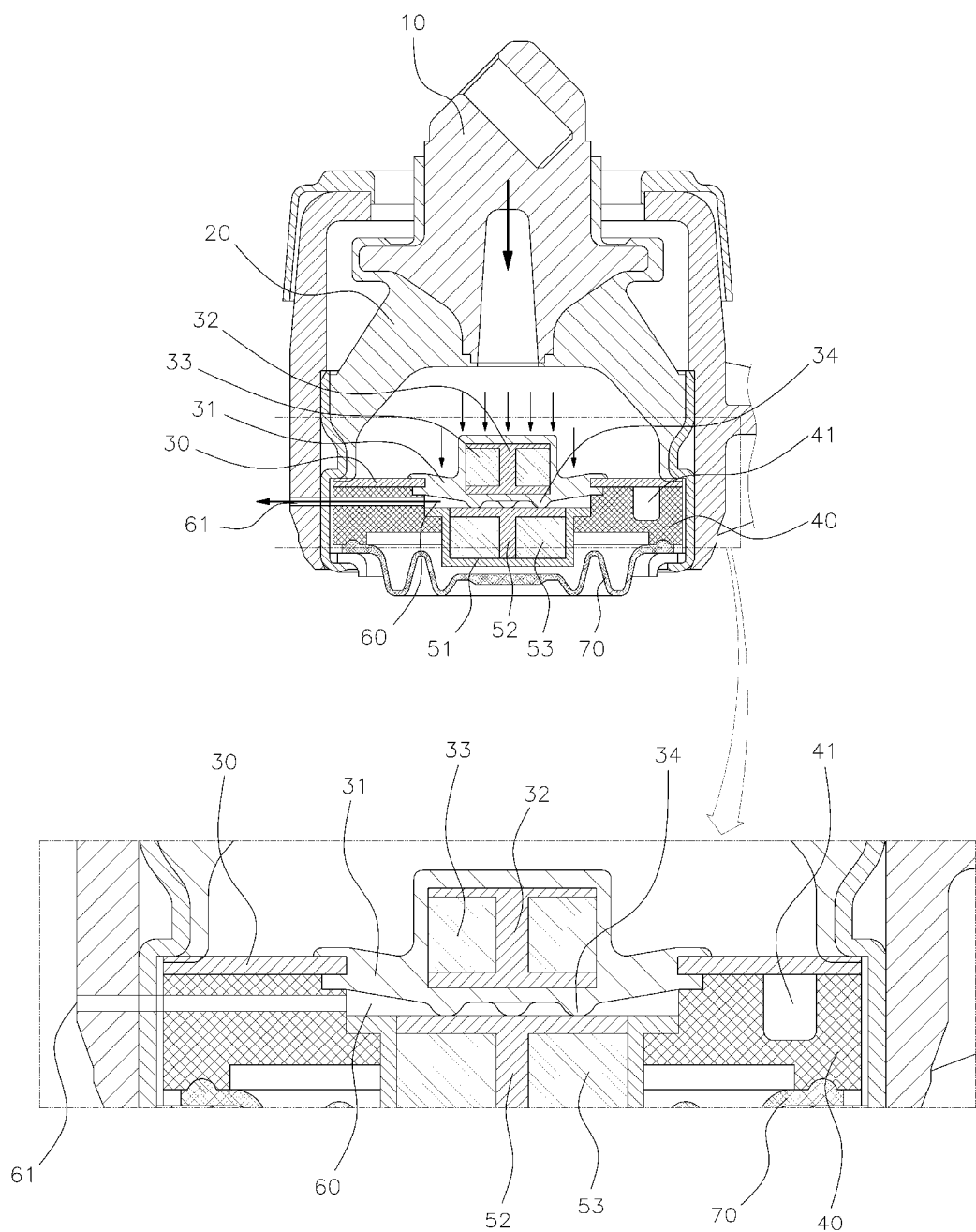
FIG. 3 is a cross-sectional view and a partially enlarged view illustrating a case in which air flows out of the electronic active mount capable of bidirectional control of the present disclosure.
Figure 4:
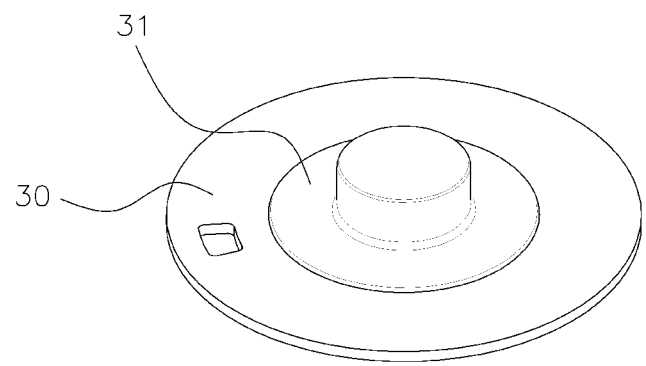
FIG. 4 is an upper perspective view illustrating an upper orifice plate and a membrane used in the present disclosure.

The aforementioned operational process of the present disclosure is illustrated in FIGS. 2 and 3.

As illustrated in FIG. 2, when the direction of a vibration phase generated on the engine mount is up, the upper electromagnet 33 and the lower electromagnet 53 are set to have the same polarities (for example, S-S poles or N-N poles), and air in the atmosphere flows into the air chamber 60 through the air hole 61, thereby forming the air chamber 60 having a height of about 4 mm.

In contrast, referring to FIG. 3, in a case in which a direction of a vibration phase generated on the engine mount is a down direction, the upper electromagnet 33 and the lower electromagnet 53 are set to have the opposite polarities (for example, N-S poles or S-N poles) attracting each other, air inside the air chamber 60 is discharged to the atmosphere through the air hole 61, and the air chamber 60 of which the height has been about 4 mm is shortened, and as a result, the membrane 31 and the lower housing 51 come into close contact with each other.

By the aforementioned process of the present disclosure, an effect of attenuating bidirectional vibrations may be achieved by using two electromagnets when the active operation is turned ON without using a permanent magnet with which supply and demand are unstable, and cost is high, unlike an electric mount of the related art. Particularly, in order to improve drawbacks of the active mount such as high dynamic characteristics when the active operation is turned off and deterioration of the NVH, the air chamber 60 connected to the atmosphere is applied between the upper and lower electromagnets, and as a result, dynamic characteristics and an NVH are improved even when the active operation is turned off.

Therefore, the present disclosure, by applying an active manner using two electromagnets having a coil structure, may produce all frequencies so as to attenuate all components of vibration caused by input vibration, and maximize NVH performance, and provide lighter weight, and lower production costs while implementing performance identical to performance of the electric active mount (a permanent magnet plus an electromagnet) used in the related art.

In addition, as the electromagnet is inserted into the membrane 31, and the air chamber 60 is provided between the upper electromagnet 33 and the lower electromagnet 53. Air chamber 60 positioned at a lower portion of the membrane 31 is connected to the atmosphere so as to absorb an input vibration even in a situation in which a CDA engine is turned off. As a result, dynamic characteristics may be improved even when the active operation is turned off, and a better NVH performance than a general hydro mount may be achieved.

While the present inventive concepts have been described regarding the specific exemplary embodiment of the present disclosure, the exemplary embodiment is just illustrative, and the present inventive concepts are not limited thereto. A person skilled in the art may change and modify the described exemplary embodiment without departing from the scope of the present disclosure, and various alterations and modifications may be possible within the equivalent scope of the technical spirit of the present invention and the appended claims.

What is claimed is:

1. An electronic active mount capable of a bidirectional control, comprising:
   a core disposed inside a housing having a cylindrical shape and connected to an engine;
   a main rubber connected an outer surface of the core and an inner surface of the housing;
   an upper orifice coupled to an end of the main rubber so as to form an upper fluid chamber capable of accommodating a fluid, and having a central portion to which a membrane is coupled to be moved in an up and down direction;
   a lower orifice connected to a lower end of the upper orifice;
   a lower housing formed at a central portion of the lower orifice; and
   a diaphragm spaced apart from the lower orifice at a predetermined distance to form a lower fluid chamber capable of accommodating a fluid,
   wherein an upper bobbin and upper electromagnet enclosing the upper bobbin are included in the membrane, and a lower bobbin and a lower electromagnet enclosing the lower bobbin are included in the lower housing.

2. The electronic active mount of claim 1, wherein the membrane and the lower housing are spaced apart from each other with a predetermined distance to form an air chamber which is a space between a lower end surface of the membrane and an upper end surface of the lower housing to accommodate air, and an air hole configured to flow air from the atmosphere in and out of the air chamber.

3. The electronic active mount of claim 2, wherein a stopper protruding in a lower direction is disposed on the lower end surface of the membrane.

4. The electronic active mount of claim 3, wherein a height of the stopper is the same as a height of the air chamber.

* * * * *